(12) United States Patent
Beltran Gracia et al.

(10) Patent No.: US 9,714,384 B2
(45) Date of Patent: Jul. 25, 2017

(54) LAYER OR ARTICLE COMPRISING POLYMER PARTICLES

(71) Applicant: MERCK PATENT GMBH, Darmstadt (DE)

(72) Inventors: Eduardo Beltran Gracia, Southhampton (GB); Owain Llyr Parri, Ringwood (GB)

(73) Assignee: MERCK PATENT GMBH, Darmstadt (DK)

( * ) Notice: Subject to any disclaimer, the term of this patent is extended or adjusted under 35 U.S.C. 154(b) by 0 days.

(21) Appl. No.: 14/785,084

(22) PCT Filed: Mar. 19, 2014

(86) PCT No.: PCT/EP2014/000750
§ 371 (c)(1),
(2) Date: Oct. 16, 2015

(87) PCT Pub. No.: WO2014/169984
PCT Pub. Date: Oct. 23, 2014

(65) Prior Publication Data
US 2016/0068755 A1 Mar. 10, 2016

(30) Foreign Application Priority Data
Apr. 18, 2013 (EP) .................................... 13002053

(51) Int. Cl.
*C09K 19/38* (2006.01)
*C09K 19/58* (2006.01)
(Continued)

(52) U.S. Cl.
CPC ............ *C09K 19/38* (2013.01); *C09K 19/586* (2013.01); *C09K 19/3804* (2013.01);
(Continued)

(58) Field of Classification Search
CPC .. C09K 19/38; C09K 19/586; C09K 2219/03; C09K 19/3804
See application file for complete search history.

(56) References Cited

U.S. PATENT DOCUMENTS 6,291,065 B1 * 9/2001 Poetsch ............... C09B 67/0097
106/31.15
9,109,160 B2 8/2015 Ramon-Gimenez et al.
(Continued)

FOREIGN PATENT DOCUMENTS

JP 2001 262144 A 9/2001
WO 2012152409 A1 11/2012

OTHER PUBLICATIONS

International Search Report dated Jun. 4, 2014 issued in corresponding PCT/EP2014/000750 application (pp. 1-2).
(Continued)

Primary Examiner — Shean C Wu
(74) Attorney, Agent, or Firm — Millen White Zelano and Branigan, PC; John Sopp; Anthony Zelano

(57) ABSTRACT

The invention relates to a layer or article comprising cholesteric liquid crystal polymer particles, which are optionally dispersed in a continuous phase, to cholesteric polymer particles for use in such a layer or article, to methods of preparing such a layer or article, and to the use of such a layer or article as optical element, in windows or electrooptical devices like liquid crystal displays (LCDs).

19 Claims, 3 Drawing Sheets

(51) Int. Cl.
C09K 19/04 (2006.01)
C09K 19/20 (2006.01)

(52) U.S. Cl.
CPC ............ *C09K 2019/0448* (2013.01); *C09K 2019/2078* (2013.01); *C09K 2219/00* (2013.01)

(56) References Cited

U.S. PATENT DOCUMENTS

2012/0202084 A1    8/2012   Tamura
2014/0085709 A1    3/2014   Ramon-Gimenez et al.

OTHER PUBLICATIONS

R. J. Hernandez, et al., "Attractive-repulsive dynamics on light-responsive chiral microparticles induced by polarized tweezers", Lab on a Chip, vol. 13 (2013) pp. 459-467.
G. Cipparrone, et al., "Chiral Self-Assembled Solid Microspheres: A Novel Multifunctional Microphotonic Device", Advanced Materials, vol. 23 (2011) pp. 5773-5778.

* cited by examiner

LAYER OR ARTICLE COMPRISING POLYMER PARTICLES

FIELD OF THE INVENTION

The invention relates to a layer or article comprising cholesteric liquid crystal polymer particles, which are optionally dispersed in a continuous phase, to cholesteric polymer particles for use in such a layer or article, to methods of preparing such a layer or article, and to the use of such a layer or article as optical element, in windows or electrooptical devices like liquid crystal displays (LCDs).

BACKGROUND AND PRIOR ART

Cholesteric liquid crystals (ChLCs) exhibit a director that is helically twisted around an axis perpendicular to the long axis of the molecules. Due to this supramolecular arrangement and the inherent birefringence of the LC molecules, ChLCs have very interesting optical properties. For example, they reflect 50% of incident non polarized light as circularly polarized light of a specific wavelength and with the same handedness as the helix, while the other 50% of the incident light will be transmitted through the cholesteric helix. The central wavelength of the reflected light $\lambda$ is related to the average refractive index n of the ChLC material and the pitch p of the helix by the following equation:

$$\lambda = p \cdot n$$

As the helical pitch p is dependent on the temperature, the wavelength $\lambda$ of the reflected light will also vary with varying temperature. This temperature dependence of the reflection wavelength can be used for example in thermochromic applications. However, at the same time this can also be an inconvenience for the stability of the optical performance for specific applications that need a stable optical effect, such as cholesteric films or cholesteric pigment flakes for use in colour filters, reflective polarisers, security elements, cosmetic products or paints.

For these applications it has therefore been suggested in prior art to use polymerized ChLCs, which are polymerized or crosslinked in their cholesteric phase. As a result the helically twisted molecular structure is permanently fixed, and the reflection wavelength becomes temperature independent.

For preparing cholesteric polymer foils it is necessary to provide the polymerizable ChLC material on a substrate, align the ChLC molecules into macroscopically uniform orientation, and then polymerize the aligned ChLC material. However, this method is time- and cost-consuming, and especially high effort is often required to ensure good uniform alignment of the ChLC within the polymerized foil.

It has also been suggested in prior art to use flat cholesteric pigment flakes, which can be used as pigments for optical, decorative or security applications, for example in cholesteric foils or printing inks. Such cholesteric flakes are usually prepared from a polymerized ChLC foil as mentioned above, which is removed from the substrate and be crushed or milled into flakes of the desired size. Again this method is time- and cost-consuming and, besides the effort needed to create unfirm alignment within the flakes, it is also necessary to apply specific milling and/or sieving techniques to obtain flakes of uniform size and shape. Also, the ChLC material in the flat flakes is oriented usually with the cholesteric helix axis perpendicular to their thickness direction. Therefore, when forming a sheet or foil from a coating comprising the flakes it has to be ensured that the flakes are coated such that they are oriented mainly parallel to the substrate to ensure good quality of reflection.

For example, prior art discloses cholesteric pigment flakes obtained by crushing polymerized films in WO 1997/000600 A2, DE 19602848 A1, WO 2008/128714 A1 and JP 2005-187542 A1, cholesteric pigment particles obtaining by template techniques in DE 19602795 A1, encapsulated ChLCs that shift the colour with the temperature in CA 1108838, the use of such ChLCs for decorative applications or in cosmetics in CH 491533 and US 2009/0190091 A1, cholesteric droplets dispersed in a continuous polymeric matrix for enhancing the contrast colour in LCDs in U.S. Pat. No. 3,734,597, or non liquid crystalline particles (organic or inorganic) coated by a cholesteric layer in WO 2012/666841 A1, JP 11315146 A1, WO 2011/048989 A1, JP 2002155241 A. However, some of the above mentioned products are based on soft-materials such as droplets and encapsulated ChLCs, which makes the pitch sensitive to the temperature and external stimuli, whereas the cholesteric flakes often have an undefined or unregular lateral shape and broad distribution of their lateral dimensions, and therefore require special milling and/or sieving techniques to achieve homogeneous particle size and shape.

Therefore there is still a need for improved ChLC polymer particles which are stable against mechanical, chemical and thermal influence, have temperature independent optical properties, exhibit uniform size and shape, and are easy to prepare. There is also a need for simple, time- and cost-effective methods of preparing layers or articles from such ChLC polymer particles. It is an aim of the present invention to provide such improved layers, articles and ChLC polymer particles, and for improved methods of preparing such layers, articles and ChLC polymer particles.

The inventors of the present invention have found that these aims can be achieved by providing ChLC layers or articles, ChLC polymer particles and methods for their preparation, as disclosed and claimed hereinafter.

In particular, the inventors of the present invention have found that these aims can be achieved by synthesizing solid cholesteric polymer particles by emulsion or suspension photopolymerization of achiral reactive mesogens (RMs) mixed with chiral dopants, or of chiral RMs. These solid cholesteric particles are obtained directly from the polymerization process with the cholesteric order frozen in, so that the optical properties of the cholesteric liquid crystal structure are permanently fixed and remain stable against external stimuli like temperature variation, mechanical stress or chemical agents. Besides, only a very simple filtration and washing process is required for their further use. The particles can be stored as a dispersion in an isotropic or anisotropic continuous phase or as a powder able to be redispersed again when a solvent is added. The continuous phase can be polar or apolar solvent, a polymerizable or polymerized matrix or an anisotropic liquid such as liquid crystals. The liquid or matrix with the dispersed particles can be coated or cast onto a substrate to form a film, foil, or another shaped article, which can be used for example as optical active film, lens, thermally insulating sheet, or as component in an electrooptical device. The particles and/or the liquid or matrix containing these particles can also be directly used in an ink, paint, as pigments or additives, for decorative, cosmetic or security applications or in optical or electrooptical devices or components thereof.

The synthesis of solid cholesteric particles has been very recently reported by Ciparrone et al (*Adv. Mater.* 2011, 23, 5773-5778, *Lab Chip*, 2013, 13, 459-467). However, there is no disclosure of a layer or article comprising such particles.

SUMMARY OF THE INVENTION

The invention relates to a layer or article comprising cholesteric polymer particles which show selective Bragg reflection of light, and which are obtainable by heterogeneous polymerization of a composition comprising at least one reactive mesogen and at least one chiral additive, or by heterogeneous polymerization of at least one chiral reactive mesogen.

The invention further relates to a layer or article comprising cholesteric polymer particles as described above and below, wherein the cholesteric polymer particles are dispersed in a continuous phase.

The invention further relates to the use of a layer or article as described above and below as optical element, and to an optical element comprising a layer or article as described above and below.

The optical element includes, without limitation, an optical retarder, optical compensator, linear polarizer, circular polarizer, mirror, collimator, diffuser, beam splitter, reflector, colour filter, monochromatic film, polychromatic film, alignment layer, polarization controlled lens, an IR reflection film or a heat insulation film.

The invention further relates to an electrooptical device, an optical data storage device or a window, comprising a layer or article or an optical element as described above and below.

The electrooptical device includes, without limitation, an LC display, autostereoscopic 3D display, electrophoretic display, and organic light emitting diode (OLED).

DEFINITIONS OF TERMS

As used herein, the terms "particle(s)" and "polymer particle(s)" are used interchangeably, and mean a multitude of isolated solid particles having uniform shape and defined dimensions, which are preferably obtained directly from a monomeric material by a polymerization process, preferably by a heterogeneous polymerization process. The particles according to the present invention have optically anisotropic properties and preferably anisotropic shape. Unless stated otherwise, the particles discussed above and below are cholesteric polymer particles.

In contrast thereto, the term "flake(s)" as used herein, and as usually understood in prior art, means flat (e.g. shard-like) particles having a defined thickness and usually undefined lateral dimensions, which are usually obtained by a multi-step process comprising coating or otherwise depositing a layer of a polymerizable material on a substrate, optionally aligning the material into uniform orientation, polymerizing the aligned material to form a polymer foil, separating the polymer foil from the substrate and crushing and optionally sieving it to give flakes.

As used herein, the term "heterogeneous polymerization" means polymerization in a heterogeneous medium (i.e. a medium comprising two immiscible phases), including but not limited to emulsion polymerization and suspension polymerization.

As used herein, the term "emulsion polymerization" means polymerization wherein the monomer has low solubility in the polymerization medium, while the polymerization initiator is soluble in the polymerization medium. The monomer is emulsified in the polymerization medium in droplets or micelles by means of an emulsification agent like for example a surfactant that is added to the polymerization medium previously. The polymerization starts in the polymerization medium by diffusion of the monomer from the droplets or micelles.

As used herein, the term "suspension polymerization" means polymerization wherein the monomer and the initiator are insoluble in the polymerization medium. Both are contained in the droplets after the emulsion is done. The polymerization starts in the monomer droplets, and can be compared to a conventional in-situ bulk polymerization.

As used herein, the term "homogeneous polymerization" means polymerization in a homogeneous medium (i.e. a medium consisting only of one phase), including but not limited to dispersion polymerization.

As used herein, the term "dispersion polymerization" means polymerization wherein both the monomer and the initiator are soluble in the polymerization medium. The polymerization starts in the polymerization medium, and the polymer precipitates from the polymerization medium.

Figure 1A:
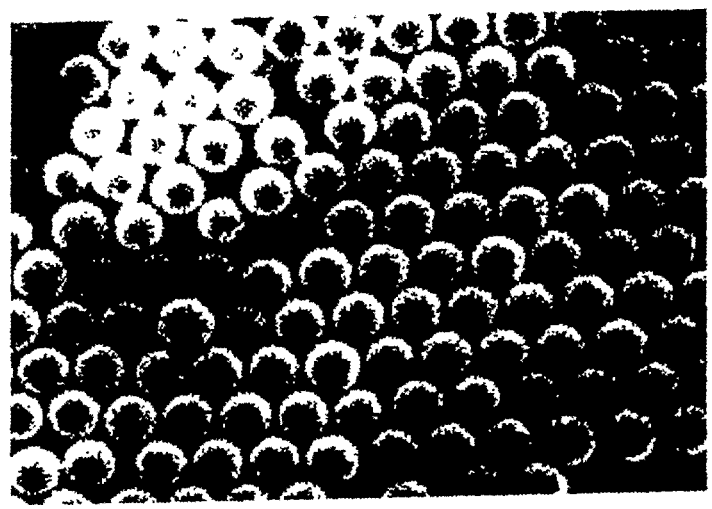
FIG. 1*a* exemplarily shows a polymer particle according to the present invention having spherical shape.
Figure 1B:
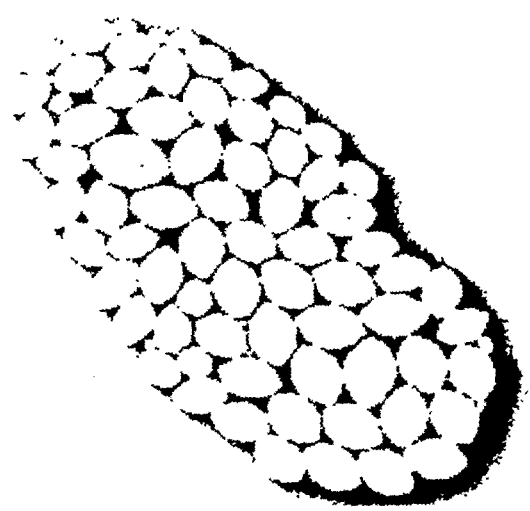
FIG. 1*b* exemplarily shows a polymer particle according to the present invention having prolate spherical shape.

As used herein, the terms "prolate spheroid" and "prolate spherical" mean a particle that is a spheroid or has a spherical shape, in which the polar axis is greater than the equatorial diameter, like a "rubgy-ball" shape, as exemplarily illustrated in FIG. 1*b*.

Figure 1C:
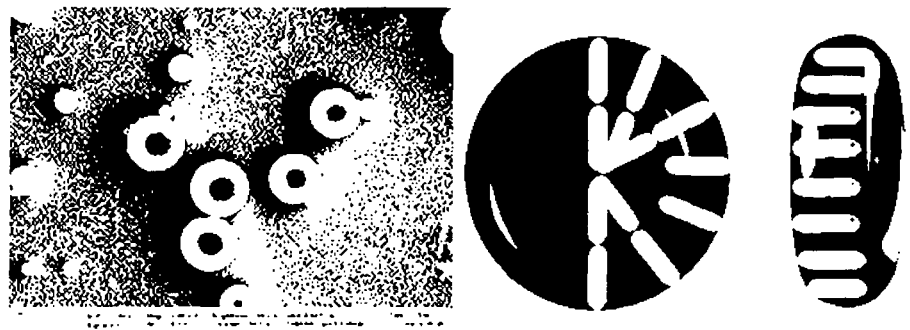
FIG. 1*c* exemplarily shows a polymer particle according to the present invention having quasi-toroidal shape.

As used herein, the term "toroidal" means a particle with a shape that is generated by revolving a plane geometrical figure about an axis external to that figure which is parallel to the plane of the figure and does not intersect the figure, like a "doughnut" shape. The term "quasi-toroidal" as used herein means a particle with a shape similar to a toroidal shape, but wherein the area enclosed by the toroid or "doughnut" is also filled by (usually a thin film of) the material forming the particle, like a "red blood cell" shape, as exemplarily illustrated in FIG. 1*c*.

As used herein, the term "continuous phase" includes any medium wherein the polymer particles according to the invention are dispersed, for example a liquid, a liquid crystal medium, a solvent, a polymerizable medium or a polymer. The continuous phase can be optically isotropic or anisotropic, for example an organic solvent, a liquid crystal medium, an isotropic polymer or polymer network, or a liquid crystal polymer or polymer network. The continuous phase can also be the polymerization medium wherein the polymer particles are prepared.

As used herein, the term "layer" includes a solid layer like a sheet or foil, which may be rigid or flexible, and which comprises the polymer particles according to the present invention, and wherein the polymer particles may also be dispersed in a solid or solidified continuous phase, like a polymer matrix. The term "layer" further includes a liquid or viscous layer comprising the polymer particles according to the present invention which are dispersed in a viscous or liquid continuous phase. The layer may also be provided on a supporting substrate or between two substrates, or be encapsulated in a solid shell.

As used herein, the term "article" includes any shaped article or object, preferably other than a layer, like for example a lens, comprising the polymer particles according to the invention, which may be dispersed in a solid or solidified continuous phase, like a polymer matrix, or dispersed in a viscous or liquid continuous phase that is encapsulated in a solid shell having the shape of the article.

As used herein, the term "optical element" includes any film, coating or shaped article that is used to modify the characteristics of light, such modifications including, without limitation, changes in the intensity of light through changes in transmission or reflectivity, changes in wavelength or wavelength distribution, changes in the state of polarization, changes in the direction of propagation of part or all of the light, or changes in the spatialdistribution of intensity by, for example, focusing, collimating, or diffusing the light.

As used herein, the term "reactive mesogen" (RM) means a polymerizable mesogenic or liquid crystalline compound, which is preferably a monomeric compound.

As used herein, the term "main component" of a composition or mixture means the compound having the highest concentration in % by weight in the composition or mixture. For example in an RM mixture as described above and below preferably the main component will be an achiral direactive or monoreactive RM.

As used herein, the terms "liquid crystal", "mesogen" and "mesogenic compound" mean a compound that under suitable conditions of temperature, pressure and concentration can exist as a mesophase or in particular as a LC phase.

As used herein, the term "mesogenic group" means a group with the ability to induce liquid crystal (LC) phase behaviour. Mesogenic groups, especially those of the non-amphiphilic type, are usually either calamitic (i.e. rod-shaped or lath-shaped) or discotic. The compounds comprising mesogenic groups do not necessarily have to exhibit an LC phase themselves. It is also possible that they show LC phase behaviour only in mixtures with other compounds, or when the mesogenic compounds or the mixtures thereof are polymerized. For the sake of simplicity, the term "liquid crystal" is used hereinafter for both mesogenic and LC materials.

Preferably the mesogenic groups and compounds as used and disclosed in this invention are selected from calamitic groups and compounds.

For an overview of terms and definitions in connection with liquid crystals and mesogens see Pure Appl. Chem. 73(5), 888 (2001) and C. Tschierske, G. PelzI and S. Diele, Angew. Chem. 2004, 116, 6340-6368.

Polymerizable compounds with one polymerizable functional group are hereinafter also referred to as "monoreactive" compounds, compounds with two polymerizable functional groups as "direactive" compounds, and compounds with more than two polymerizable functional groups as "multireactive" compounds. Compounds without a polymerizable functional group are also referred to as "non-reactive" compounds.

As used herein, the term "spacer" or "spacer group", also abbreviated as "Sp", is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless stated otherwise, the term "spacer" or "spacer group" above and below denotes a flexible organic group, which in a polymerizable mesogenic compound ("RM") connects the mesogenic group and the polymerizable group(s).

As used herein, the term "RM mixture" means a mixture comprising two or more RMs, and optionally comprising further materials.

As used herein, the term "helical twisting power (HTP)" means the effectiveness of a chiral compound to induce a helically twisted molecular structure in a liquid crystal host material. The HTP is given in first approximation, which is sufficient for most practical applications, by the following equation:

$$HTP = \frac{1}{p \cdot c}$$

wherein c is the concentration of the chiral compound in the host material and p is the helical pitch.

DETAILED DESCRIPTION

The polymer particles according to this invention are prepared by polymerizing an RM or an RM mixture comprising two or more RMs, wherein preferably at least one RM has two or more polymerizable functional groups. As a result the particles are cross-linked and the cholesteric mesophase is frozen, thereby the optical properties derived from the cholesteric order are inherent to each isolated particle.

In principle, the particles can exhibit a selective Bragg reflection covering the whole spectrum by choosing a suitable RM or RM mixture. Preferably the particles are obtained by polymerization of a material having as a main component an achiral direactive or monoreactive mesogen. The cholesteric order is preferably provided by adding a non reactive or reactive chiral dopant to the achiral RM. These chiral dopants are chosen with a high helical twisting power value (HTP) in order to use only a small amount, although the invention is not restricted to high HTP value compounds. Alternatively or additionally a chiral RM can also be used in addition or alternatively to the achiral RM.

The cholesteric internal molecular order of the particles results in remarkable optical effects which can be used for optical, decorative or security purposes. For example the particles or layers or articles comprising them can be used for identifying security documents, wherein a marked substrate can be identified by reading it with an optical microscope able to discriminate both handedness of the circularly polarized light. The particles exhibit an unique reflection pattern of the light when the light is polarized with the opposite sense with respect to the helix twist of the particles. The particles show the reflection of the light for the right-handed circularly polarized light (RHP) as a central spot on the top of each particle and a ring-like patterned reflection on the top of each particle for the opposite sense. The latter pattern of reflection can be used as an additional security level as the normal behaviour for cholesteric flakes is to transmit the light with the opposite sense with respect to the helix twist, leading to a dark texture.

Due to the radial configuration of the molecular director, the position of each particle with respect to the others is not important and the reflected light is always going to be perpendicular to the sheets. Due to this no alignment layer is required in the preparation of coated layers or sheets from the particles.

The polymer particles according to this invention are preferably prepared from an RM or an RM mixture as described above and below.

In a preferred embodiment the RM mixture comprises one or more additives selected from mono-, di- or multireactive polymerizable non-mesogenic compounds. Typical examples of monoreactive polymerizable non-mesogenic compounds are alkylacrylates and alkylmethacrylates. Typical examples of direactive non-mesogenic compounds are alkyldiacrylates or alkyldimethacrylates with alkyl groups of 1 to 20 C atoms. Typical examples of multireactive non-mesogenic compounds are tri methylpropanetrimethacrylate or pentaerythritoltetraacrylate.

If a single RM is used, it can be a monoreactive or a di- or multireactive RM, but is preferably selected from di- or multireactive RMs.

If an RM mixture is used, it preferably comprises one or more monoreactive RMs, and one or more di- or multireactive RMs.

Di- and multireactive RMs are preferably selected of formula I $$P^1\text{-Sp}^1\text{-MG-Sp}^2\text{-}P^2 \qquad\qquad I$$

wherein $P^1$ and $P^2$ independently of each other denote a polymerizable group, $Sp^1$ and $Sp^2$ independently of each other are a spacer group or a single bond, and MG is a mesogenic group, which is preferably selected of formula II $$\text{-}(A^1\text{-}Z^1)_n\text{-}A^2\text{-} \qquad\qquad II$$

wherein
$A^1$ and $A^2$ denote, in case of multiple occurrence independently of one another, an aromatic or alicyclic group, which optionally contains one or more heteroatoms selected from N, O and S, and is optionally mono- or polysubstituted by L,
L is P-Sp-, F, Cl, Br, I, —CN, —NO$_2$, —NCO, —NCS, —OCN, —SCN, —C(=O)NR$^{00}$R$^{000}$, —C(=)X$^0$, —C(=O)OR$^{00}$, —C(=O)R$^0$, —NR$^{00}$R$^{000}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or al koxycarbonyloxy with 1 to 12, preferably 1 to 6 C atoms, wherein one or more H atoms are optionally replaced by F or Cl,
R$^{00}$ and R$^{000}$ independently of each other denote H or alkyl with 1 to 12 C-atoms,
X$^0$ is halogen, preferably F or Cl,
Z$^1$ denotes, in case of multiple occurrence independently of one another, —O—, —S—, —CO—, —COO—, —OCO—, —S—CO—, —CO—S—, —O—COO—, —CO—NR$^{00}$—, —NR$^{00}$—CO—, —NR$^{00}$—CO—NR$^{000}$, —NR$^{00}$—CO—O—, —O—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_{n1}$, —CF$_2$CH$_2$—, —CH$_2$CF$_2$—, —CF$_2$CF$_2$—, —CH=N—, —N=CH—, —N=N—, —CH=CR$^{00}$—, —CY$^1$=CY$^2$—, —C≡C—, —CH=CH—COO—, —OCO—CH=CH— or a single bond, preferably —COO—, —OCO— or a single bond,
$Y^1$ and $Y^2$ independently of each other denote H, F, Cl or CN,
n is 1, 2, 3 or 4, preferably 1 or 2, most preferably 2,
n1 is an integer from 1 to 10, preferably 1, 2, 3 or 4.

Preferred groups $A^1$ and $A^2$ include, without limitation, furan, pyrrol, thiophene, oxazole, thiazole, thiadiazole, imidazole, phenylene, cyclohexylene, bicyclooctylene, cyclohexenylene, pyridine, pyrimidine, pyrazine, azulene, indane, fluorene, naphthalene, tetrahydronaphthalene, anthracene, phenanthrene and dithienothiophene, all of which are unsubstituted or substituted by 1, 2, 3 or 4 groups L as defined above.

Particular preferred groups $A^1$ and $A^2$ are selected from 1,4-phenylene, pyridine-2,5-diyl, pyrimidine-2,5-diyl, thiophene-2,5-diyl, naphthalene-2,6-diyl, 1,2,3,4-tetrahydronaphthalene-2,6-diyl, indane-2,5-diyl, bicyclooctylene or 1,4-cyclohexylene wherein one or two non-adjacent CH$_2$ groups are optionally replaced by O and/or S, wherein these groups are unsubstituted or substituted by 1, 2, 3 or 4 groups L as defined above.

Preferred RMs of formula I are selected of formula Ia

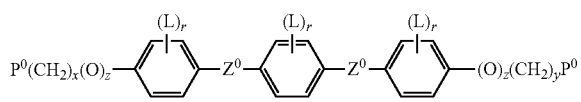

wherein
$P^0$ is, in case of multiple occurrence independently of one another, a polymerizable group, preferably an acryl, methacryl, oxetane, epoxy, vinyl, vinyloxy, propenyl ether or styrene group,
$Z^0$ is —COO—, —OCO—, —CH$_2$CH$_2$—, —CF$_2$O—, —OCF$_2$—, —C≡C—, —CH=CH—, —OCO—CH=CH—, —CH=CH—COO—, or a single bond,
L has on each occurrence identically or differently one of the meanings given for $L^1$ in formula I, and is preferably, in case of multiple occurrence independently of one another, selected from F, Cl, CN or optionally halogenated alkyl, alkoxy, alkylcarbonyl, alkoxycarbonyl, alkylcarbonyloxy or alkoxycarbonyloxy with 1 to 5 C atoms,
r is 0, 1, 2, 3 or 4,
x and y are independently of each other 0 or identical or different integers from 1 to 12,
z is 0 or 1, with z being 0 if the adjacent x or y is 0.

Very preferred RMs of formula I are selected from the following formulae:

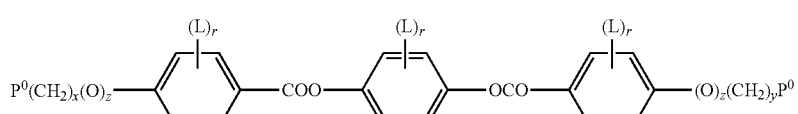

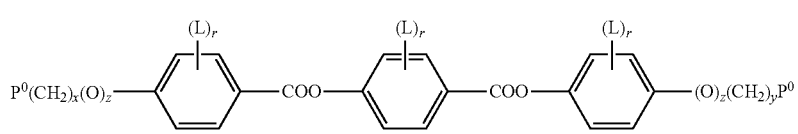

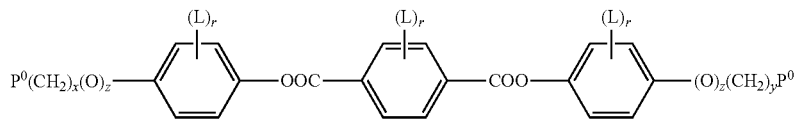
Ia3

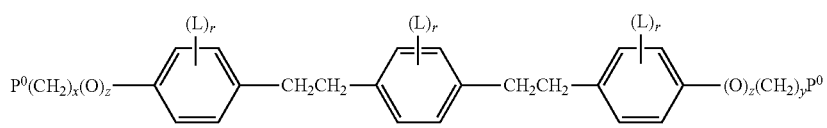
Ia4

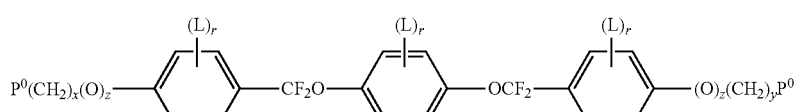
Ia5

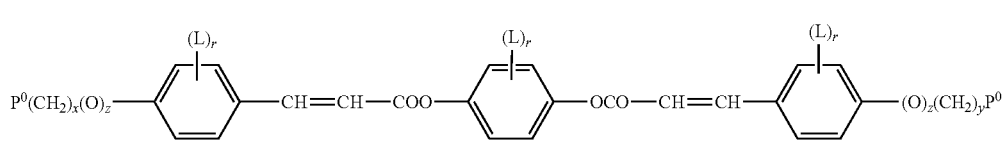
Ia6

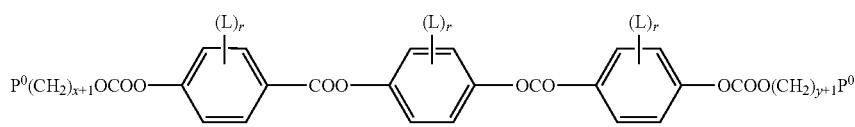
Ia7

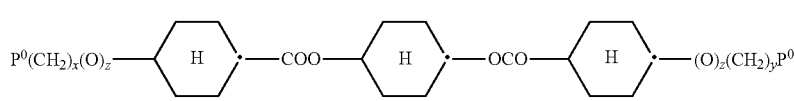
Ib

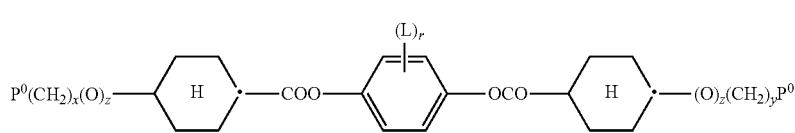
Ic

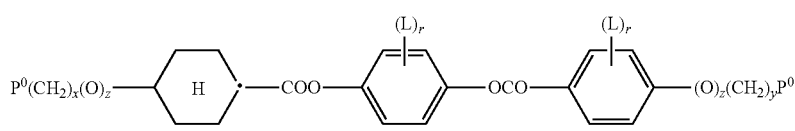
Id

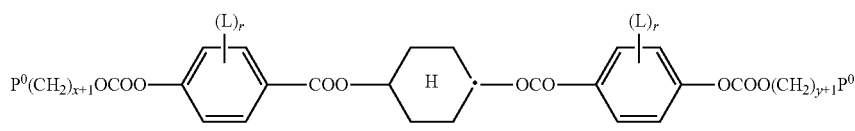
Ie wherein $P^0$, L, r, x, y and z are as defined in formula Ia.

Especially preferred are compounds of formula Ia1, Ia2 and Ia3, in particular those of formula Ia1.

The concentration of di- or multireactive RMs, preferably those of formula I and its subformulae, in the RM mixture is preferably from 5% wt to 95% wt. Monoreactive RMs are preferably selected from formula III:

$$P^1\text{-}Sp^1\text{-}MG\text{-}R \qquad \text{III}$$

wherein $P^1$, $Sp^1$ and MG have the meanings given in formula I,

R denotes P-Sp-, F, Cl, Br, I, —CN, —$NO_2$, —NCO, —NCS, —OCN, —SCN, —C(=O)$NR^{00}R^{000}$, —C(=O)X, —C(=O)$OR^0$, —C(=O)$R^{00}$, —$NR^{00}R^{000}$, —OH, —$SF_5$, optionally substituted silyl, straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, X is halogen, preferably F or Cl, and $R^{00}$ and $R^{000}$ are independently of each other H or alkyl with 1 to 12 C-atoms.

Preferably the RMs of formula II are selected from the following formulae.

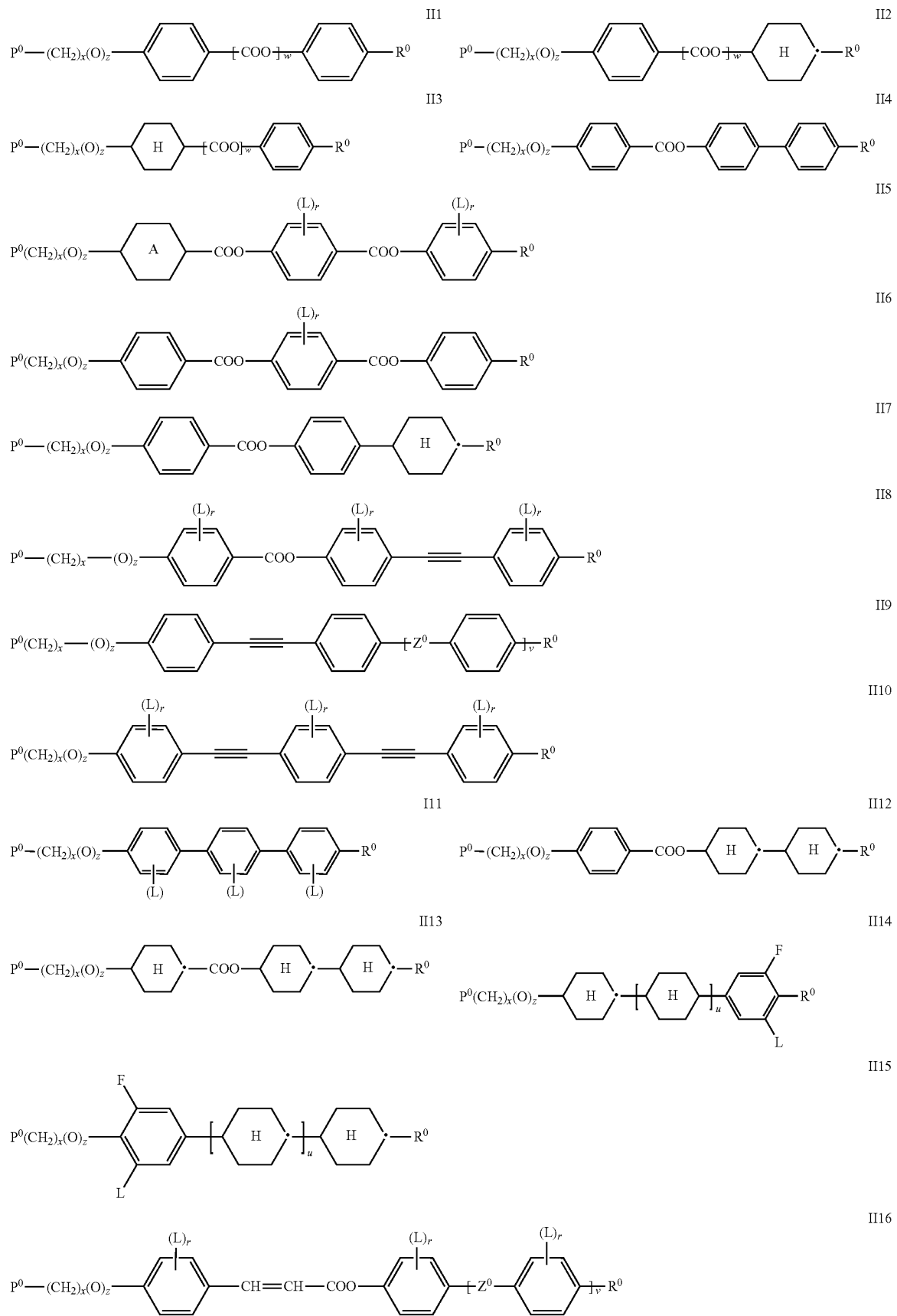

-continued

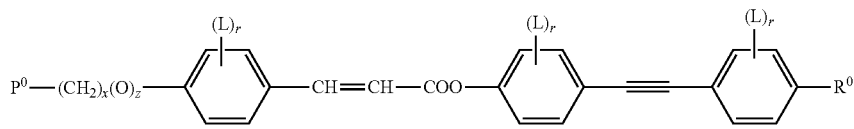
II17

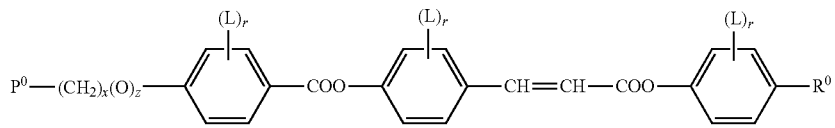
II18

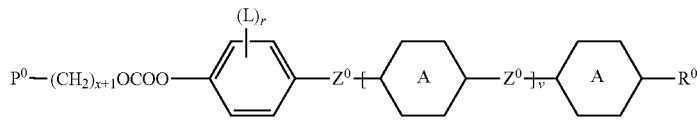
II19

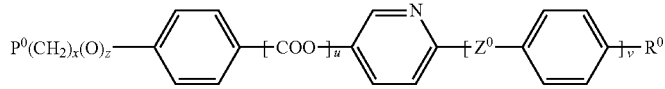
II20

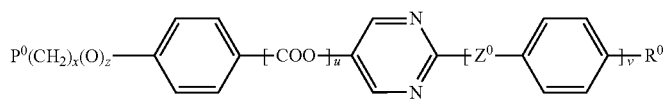
II21

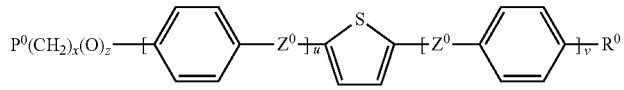
II22

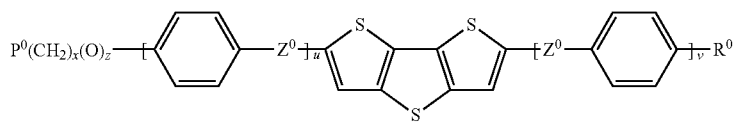
II23

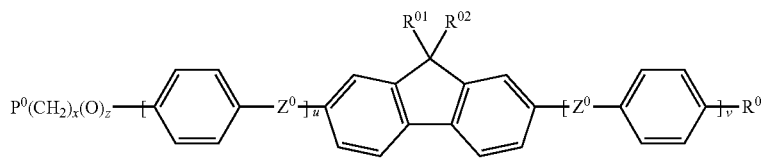
II24

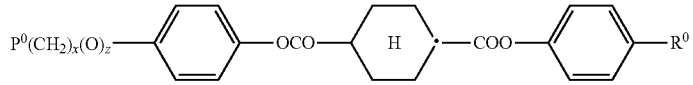
II25

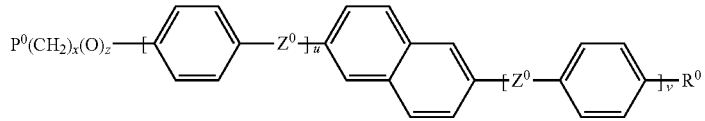
II26

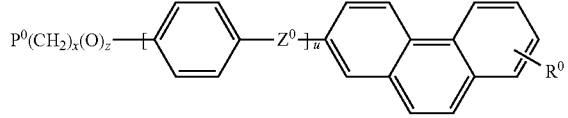
II27 wherein $P^0$, L, r, x, y and z are as defined in formula Ia, $R^0$ is alkyl, alkoxy, thioalkyl, alkylcarbonyl, alkoxycarbonyl, alkylcarbonyloxy or alkoxycarbonyloxy with 1 or more, preferably 1 to 15 C atoms which is optionally fluorinated, or denotes $Y^0$ or $P—(CH_2)_y—(O)_z—$,
$X^0$ is —O—, —S—, —CO—, —COO—, —OCO—, —O—COO—, —CO—NR$^{01}$—, —NR$^{01}$—CO—, —NR$^{01}$—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^{01}$—, —CF=CF—, —C≡C—, —CH=CH—COO—, —OCO—CH=CH— or a single bond
$Y^0$ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, A is, in case of multiple occurrence independently of one another, 1,4-phenylene that is unsubstituted or substituted with 1, 2, 3 or 4 groups L, or trans-1,4-cyclohexylene,
$R^{01,02}$ are independently of each other H, $R^0$ or $Y^0$,
u and v are independently of each other 0, 1 or 2,
w is 0 or 1,
and wherein the benzene and napthalene rings can additionally be substituted with one or more identical or different groups L.

Especially preferred are compounds of formula II1, II2, II3, II4, II5, II6, II7, II8, II9 and II10, in particular those of formula II1, II4, II6, II7 and II8.

The concentration of monoreactive RMs in the RM mixture is preferably from 5% wt. to 95% wt.

In formulae I, II, III and their preferred subformulae, L and $L^{1-3}$ are preferably selected from F, Cl, CN, $NO_2$ or straight chain or branched alkyl, alkoxy, alkylcarbonyl, alkoxycarbonyl, alkylcarbonlyoxy or alkoxycarbonyloxy with 1 to 12 C atoms, wherein the alkyl groups are optionally perfluorinated, or P-Sp-.

Very preferably L and $L^{1-3}$ are selected from F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, in particular F, Cl, CN, $CH_3$, $C_2H_5$, $C(CH_3)_3$, $CH(CH_3)_2$, $OCH_3$, $COCH_3$ or $OCF_3$, most preferably F, Cl, $CH_3$, $C(CH_3)_3$, $OCH_3$ or $COCH_3$, or P-Sp-.

A substituted benzene ring of the formula

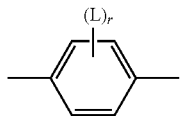

is preferably

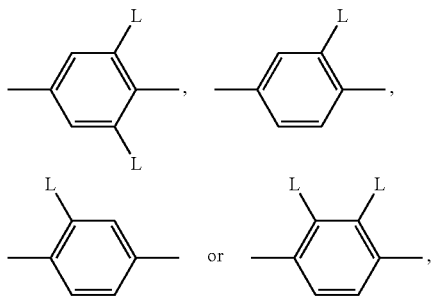

with L having each independently one of the meanings given above.

In formulae I, II, III and their preferred subformulae, an alkyl or alkoxy radical, i.e. where the terminal $CH_2$ group is replaced by —O—, can be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2- (=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

An alkyl group wherein one or more $CH_2$ groups are replaced by —CH=CH— can be straight-chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C atoms are generally preferred.

In an alkyl group wherein one $CH_2$ group is replaced by —O— and one by —CO—, these radicals are preferably neighboured. Accordingly these radicals together form a carbonyloxy group —CO—O— or an oxycarbonyl group —O—CO—. Preferably this group is straight-chain and has 2 to 6 C atoms. It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxy-carbonylmethyl, propoxycarbonylmethyl, butoxycarbonylmethyl, 2-(methoxycarbonyl)ethyl, 2-(ethoxycarbonyl)ethyl, 2-(propoxy-carbonyl)ethyl, 3-(methoxycarbonyl)propyl, 3-(ethoxycarbonyl)propyl, 4-(methoxycarbonyl)-butyl.

An alkyl group wherein two or more $CH_2$ groups are replaced by —O— and/or —COO— can be straight-chain or branched. It is preferably straight-chain and has 3 to 12 C atoms. Accordingly it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-hexyl.

An alkyl or alkenyl group that is monosubstituted by CN or $CF_3$ is preferably straight-chain. The substitution by CN or $CF_3$ can be in any desired position.

An alkyl or alkenyl group that is at least monosubstituted by halogen is preferably straight-chain. Halogen is preferably F or Cl, in case of multiple substitution preferably F. The resulting groups include also perfluorinated groups. In case of monosubstitution the F or Cl substituent can be in any desired position, but is preferably in ω-position. Examples for especially preferred straight-chain groups with a terminal F substituent are fluoromethyl, 2-fluoroethyl, 3-fluoropropyl, 4-fluorobutyl, 5-fluoropentyl, 6-fluorohexyl and 7-fluoroheptyl. Other positions of F are, however, not excluded.

$R^{00}$ and $R^{000}$ are preferably selected from H, straight-chain or branched alkyl with 1 to 12 C atoms.

—$CY^1$=$CY^2$— is preferably —CH=CH—, —CF=CF— or —CH=C(CN)—.

Halogen is F, Cl, Br or I, preferably F or Cl.

R, $R^0$, $R^1$ and $R^2$ can be an achiral or a chiral group. Particularly preferred chiral groups are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

Preferred achiral branched groups are isopropyl, isobutyl (=methylpropyl), isopentyl (=3-methylbutyl), isopropoxy, 2-methyl-propoxy and 3-methylbutoxy.

In formulae I, II, III and their preferred subformulae, the polymerizable groups P, $P^1$, $P^2$ and $P^0$ denote a group that is capable of participating in a polymerization reaction, like radical or ionic chain polymerization, polyaddition or polycondensation, or capable of being grafted, for example by condensation or addition, to a polymer backbone in a polymer analogous reaction. Especially preferred are polymerizable groups for chain polymerization reactions, like radical, cationic or anionic polymerization. Very preferred are polymerizable groups comprising a C—C double or triple bond, and polymerizable groups capable of polymerization by a ring-opening reaction, like oxetanes or epoxides.

Suitable and preferred polymerizable groups P, $P^1$, $P^2$ and $P^0$ include, without limitation, $CH_2$=$CW^1$—COO—, $CH_2$=$CW^1$—CO—,

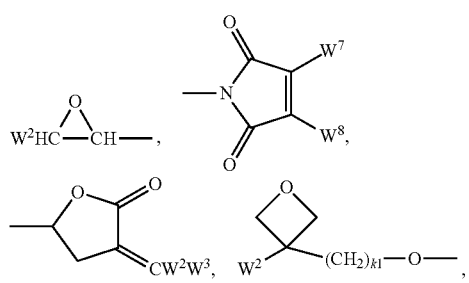

$CH_2$=$CW^2$—(O)$_{k1}$—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO—$CW^2W^3$—, HS—$CW^2W^3$—, H$W^2$N—, HO—$CW^2W^3$—NH—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN—, and $W^4W^5W^6$Si—, with $W^1$ being H, F, Cl, CN, $CF_3$, phenyl or alkyl with 1 to 5 C-atoms, in particular H, Cl or $CH_3$, $W^2$ and $W^3$ being independently of each other H or alkyl with 1 to 5 C-atoms, in particular H, methyl, ethyl or n-propyl, $W^4$, $W^5$ and $W^6$ being independently of each other Cl, oxaalkyl or oxacarbonylalkyl with 1 to 5 C-atoms, $W^7$ and $W^8$ being independently of each other H, Cl or alkyl with 1 to 5 C-atoms, Phe being 1,4-phenylene that is optionally substituted, preferably by one or more groups L as defined above (except for the meaning P-Sp-), and $k_1$ and $k_2$ being independently of each other 0 or 1.

Very preferred polymerizable groups P, $P^1$, $P^2$ and $P^0$ are selected from $CH_2$=$CW^1$—COO—, $CH_2$=$CW^1$—CO—,

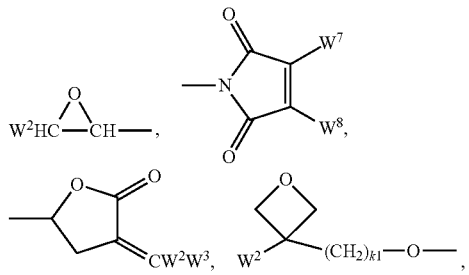

($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO—$CW^2W^3$—, HS—$CW^2W^3$—, H$W^2$N—, HO—$CW^2W^3$—NH—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN—, and $W^4W^5W^6$Si—, with $W^1$ being H, F, Cl, CN, $CF_3$, phenyl or alkyl with 1 to 5 C-atoms, in particular H, F, Cl or $CH_3$, $W^2$ and $W^3$ being independently of each other H or alkyl with 1 to 5 C-atoms, in particular H, methyl, ethyl or n-propyl, $W^4$, $W^5$ and $W^6$ being independently of each other Cl, oxaalkyl or oxacarbonylalkyl with 1 to 5 C-atoms, $W^7$ and $W^8$ being independently of each other H, Cl or alkyl with 1 to 5 C-atoms, Phe being 1,4-phenylene that is optionally substituted preferably by one or more groups L as defined above (except for the meaning P-Sp-), and $k_1$ and $k_2$ being independently of each other 0 or 1.

Most preferred polymerizable groups P, $P^1$, $P^2$ and $P^0$ are selected from $CH_2$=CH—COO—, $CH_2$=C($CH_3$)—COO—, $CH_2$=CF—COO—, ($CH_2$=CH)$_2$CH—OCO—, ($CH_2$=CH)$_2$CH—O—,

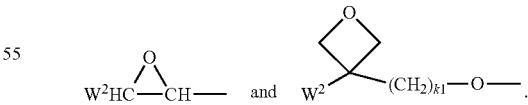

Further preferably P, $P^1$, $P^2$ and $P^0$ are selected from the group consisting of vinyloxy, acrylate, methacrylate, fluoroacrylate, chloroacrylate, oxetane and epoxide groups, and particularly preferably denote an acrylate, methacrylate or oxetane group.

Polymerization can be carried out according to methods that are known to the ordinary expert and described in the literature, for example in D. J. Broer; G. Challa; G. N. Mol, *Macromol. Chem*, 1991, 192, 59.

In formulae I, II, III and their preferred subformulae, the spacer groups Sp, $Sp^1$ and $Sp^2$ are preferably selected of formula Sp'-X', such that e.g. P-Sp- is P-Sp'-X'—, wherein Sp' is alkylene with 1 to 20 C atoms, preferably 1 to 12 C-atoms, which is optionally mono- or polysubstituted by F, Cl, Br, I or CN, and wherein one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —S—CO—, —CO—S—, —$NR^0$—CO—O—, —O—CO—$NR^0$—, —$NR^0$—CO—$NR^0$—, —CH=CH— or —C≡C— in such a manner that O and/or S atoms are not linked directly to one another, X' is —O—, —S—, —CO—, —COO—, —OCO—, —O—COO—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^0$—, —$CY^1$=$CY^2$—, —C≡C—, —CH=CH—COO—, —OCO—CH=CH— or a single bond, $R^0$ and $R^{00}$ are independently of each other H or alkyl with 1 to 12 C-atoms, and $Y^1$ and $Y^2$ are independently of each other H, F, Cl or CN. X' is preferably —O—, —S—, —CO—, —COO—, —OCO—, —O—COO—, —CO—$NR^0$—, —$NR^0$—CO—, —$NR^0$—CO—$NR^0$— or a single bond.

Typical groups Sp' are, for example, —$(CH_2)_{p1}$—, —$(CH_2CH_2O)_{q1}$—$CH_2CH_2$—, —$CH_2CH_2$—S—$CH_2CH_2$— or —$CH_2CH_2$—NH—$CH_2CH_2$— or —$(SiR^0R^{00}$—O$)_{p1}$—, with p1 being an integer from 2 to 12, q1 being an integer from 1 to 3 and $R^0$ and $R^{00}$ having the meanings given above.

Preferred groups Sp' are ethylene, propylene, butylene, pentylene, hexylene, heptylene, octylene, nonylene, decylene, undecylene, dodecylene, octadecylene, ethyleneoxyethylene, methyleneoxy-butylene, ethylene-thioethylene, ethylene-N-methyl-iminoethylene, 1-methylalkylene, ethenylene, propenylene and butenylene for example.

Further preferred are compounds wherein the polymerizable group is directly attached to the mesogenic group without a spacer group Sp.

In case of compounds with multiple groups P-Sp-, $P^1$-$Sp^1$- etc., the multiple polymerizable groups P, $P^1$ and the multiple spacer groups Sp, $Sp^1$ can be identical or different from one another.

In another preferred embodiment the reactive compounds comprise one or more terminal groups $R^{0,1,2}$ or substituents L or $L^{1-3}$ that are substituted by two or more polymerizable groups P or P-Sp- (multifunctional polymerizable groups). Suitable multifunctional polymerizable groups of this type are disclosed for example in U.S. Pat. No. 7,060,200 B1 oder US 2006/0172090 A1. Very preferred are compounds comprising one or more multifunctional polymerizable groups selected from the following formulae:

| | |
|---|---|
| —X-alkyl-$CHP^1$—$CH_2$—$CH_2P^2$ | P1 |
| —X'-alkyl-C($CH_2P^1$)($CH_2P^2$)—$CH_2P^3$ | P2 |
| —X'-alkyl-$CHP^1CHP^2$—$CH_2P^3$ | P3 |
| —X'-alkyl-C($CH_2P^1$)($CH_2P^2$)—$C_{aa}H_{2aa+1}$ | P4 |
| —X'-alkyl-$CHP^1$—$CH_2P^2$ | P5 |
| —X'-alkyl-$CHP^1P^2$ | P5 |
| —X'-alkyl-$CP^1P^2$—$C_{aa}H_{2aa+1}$ | P6 |
| —X'-alkyl-C($CH_2P^1$)($CH_2P^2$)—$CH_2OCH_2$—C($CH_2P^3$)($CH_2P^4$)$CH_2P^5$ | P7 |
| —X'-alkyl-CH(($CH_2)_{aa}P^1$)(($CH_2)_{bb}P^2$) | P8 |
| —X'-alkyl-$CHP^1CHP^2$—$C_{aa}H_{2aa+1}$ | P9 | wherein alkyl is straight-chain or branched alkylene having 1 to 12 C-atoms which is unsubstituted, mono- or polysubstituted by F, Cl, Br, I or CN, and wherein one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —O—CO—O—, —S—CO—, —CO—S—, —$SO_2$—, —CO—$NR^0$—, —$NR^0$—CO—, —$NR^0$—CO—$NR^{00}$—, —$CY^1$=$CY^2$— or —C≡C— in such a manner that O and/or S atoms are not linked directly to one another, with $R^0$ and $R^{00}$ having the meanings given above, or denotes a single bond, aa and bb are independently of each other 0, 1, 2, 3, 4, 5 or 6, X' is as defined above, and $P^{1-5}$ independently of each other have one of the meanings given for P above.

For preparation of the cholesteric polymer particles according to the present invention a chiral RM or RM mixture is used, and/or a chiral additive is added to an achiral or chiral RM or RM mixture. The chiral additive is a chiral compound that can be unpolymerizable or polymerizable. Suitable chiral additives can be selected from chiral RMs and chiral dopants, many of which are well known to the skilled person and are commercially available.

Suitable unpolymerizable chiral compounds are for example chiral dopants like R- or S-811, R- or S-1011, R- or S-2011, R- or S-3011, R- or S-4011, R- or S-5011, or CB 15 (all available from Merck KGaA, Darmstadt, Germany).

Suitable polymerizable chiral compounds are for example chiral RMs (R1) to (R10) listed below, or the polymerizable chiral material Paliocolor® LC756 (from BASF AG, Ludwigshafen, Germany).

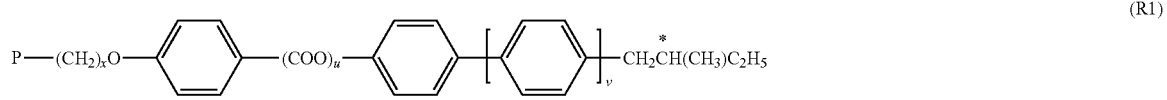

(R1)

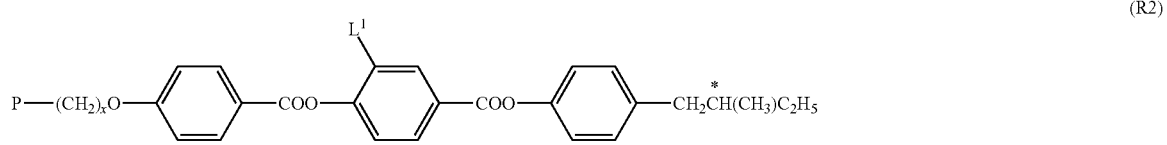

(R2)

-continued

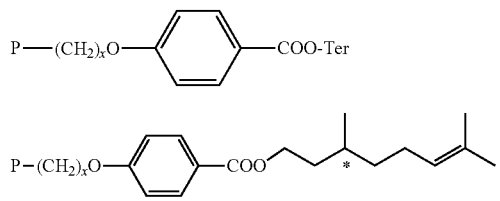
(R3)

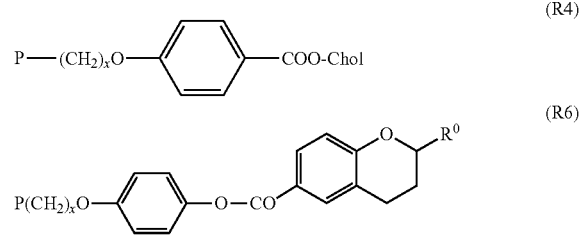
(R4)

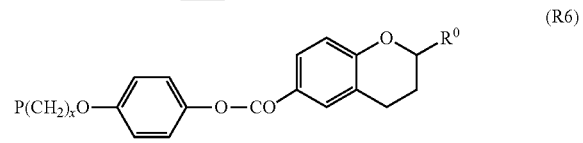
(R5)

(R6)

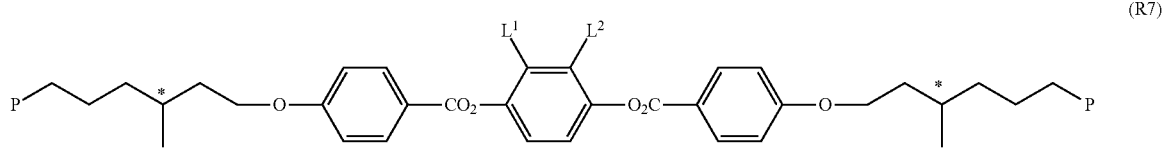
(R7)

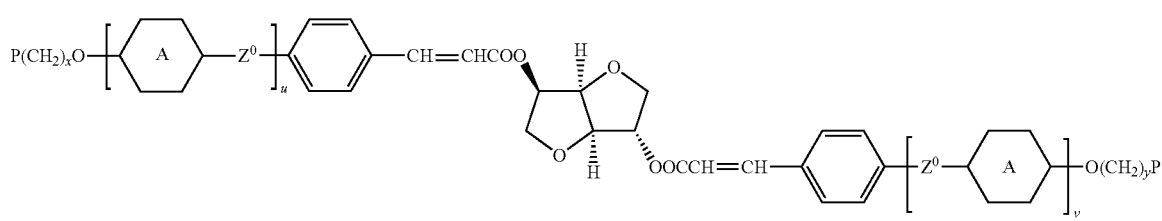
(R8)

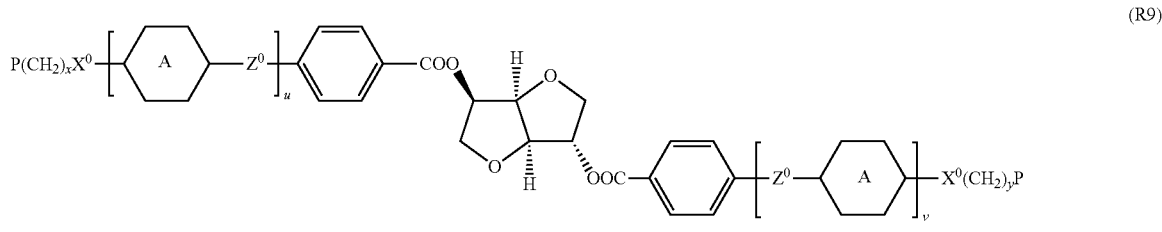
(R9)

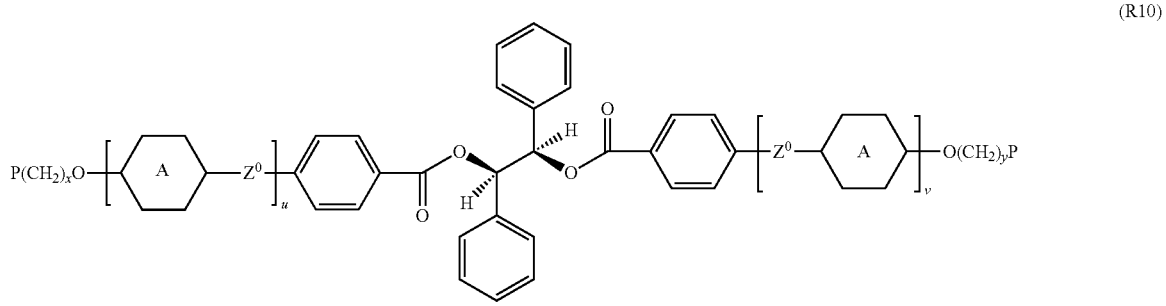
(R10)

wherein P has one of the meanings given for P⁰ above, Z⁰, u, v, x, y, R⁰ and A are as defined above, and $L^1$ and $L^2$ have independently of each other one of the meanings of L as given above.

Very preferred are chiral compounds with a high HTP, in particular compounds comprising a sorbitol group as described for example in WO 98/00428, compounds comprising a hydrobenzoin group as described for example in GB 2,328,207, chiral binaphthyl derivatives as described for example in WO 02/94805, chiral binaphthol acetal derivatives as described for example in WO 02/34739, chiral TADDOL derivatives as described for example in WO 02/06265, and chiral compounds having at least one fluorinated linkage group and a terminal or central chiral group as described for example in WO 02/06196 or WO 02/06195.

Especially preferred are chiral compounds with a HTP of 40 µm⁻¹ or higher, very preferably 60 µm⁻¹ or higher, most preferably 80 µm⁻¹ or higher.

Especially preferred are polymerizable sorbitols like those of formula (R8) and (R9) and polymerizable hydrobenzoins like those of formula (R10).

Further preferred are non-polymerizable sorbitols and hydrobenzoins of formula M1 and M2 below. Further preferred are chiral binaphthols of formula M3 and M4 below.

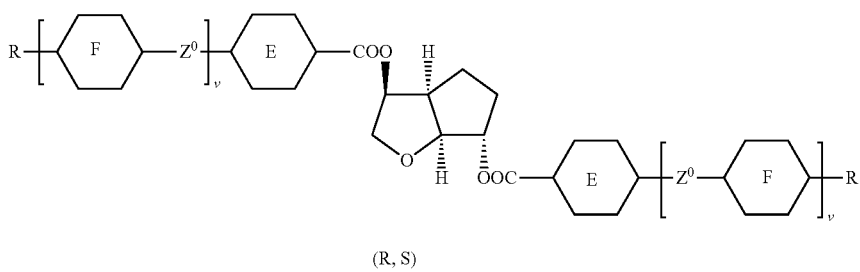

M1

(R, S)

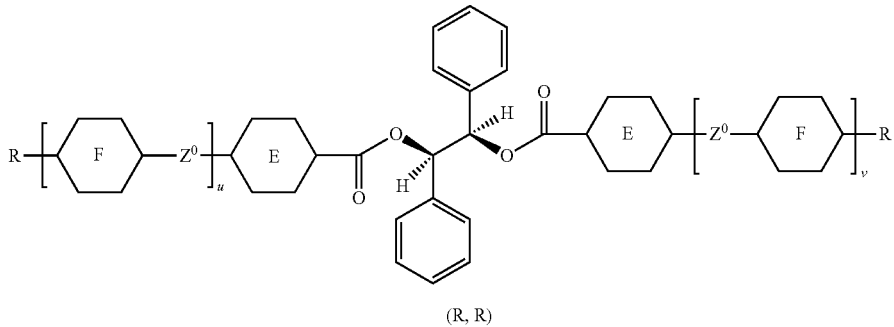

M2

(R, R)

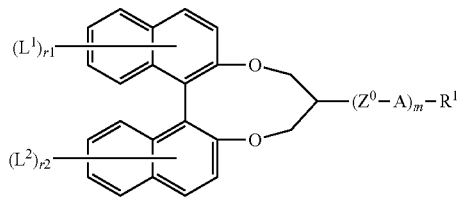

M3

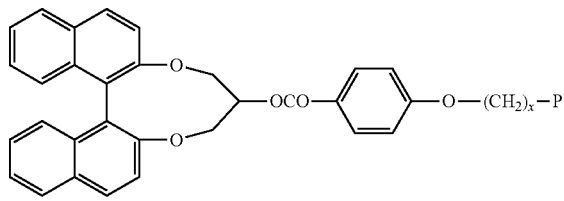

M4 wherein P, $Z^0$, A $L^1$, $L^2$, v and x have the meanings given above, $R^1$ has one of the meanings of $R^0$ given above or is P-Sp, R has one of the meanings of $R^0$, m is 0, 1, 2 or 3 and r1 and r2 are 0, 1, 2, 3 or 4.

Very preferred are compounds of formula M3 wherein $R^1$ is P-Sp. Further preferred are compounds of formula M3 wherein m is 0 or 1, $Z^0$ is —COO—, —OCO— or a single bond, A is 1,4-phenylene optionally substituted by 1 or 2 groups $L^1$ or trans-1,4-cyclohexylene.

The RM or RM mixture without the chiral additive preferably exhibits a nematic LC phase, or a smectic LC phase and a nematic LC phase, very preferably a nematic LC phase at room temperature.

The RM or RM mixture with the chiral additive preferably exhibits a cholesteric LC phase, very preferably a cholesteric LC phase at room temperature.

The RM or RM mixture may further comprise one or more additives selected from the group consisting of polymerization initiators, surfactants, stabilisers, catalysts, sensitizers, inhibitors, chain-transfer agents, co-reacting monomers or surface-active compounds.

Polymerization to form polymer particles can be achieved by exposing the RM or RM mixture to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation. As a source for actinic radiation for example a single UV lamp or a set of UV lamps can be used. When using a high lamp power the curing time can be reduced. Another possible source for actinic radiation is a laser, like for example a UV, IR or visible laser.

The polymer particles are preferably polymerized by photoinitiated or thermally initiated polymerization, preferably in the presence of a polymerization initiator. Suitable initiators for both types of polymerization are well known to the person skilled in the art. Thermal initiation is especially preferred for the production of particles at large scale, however, this invention is not limited to this kind of polymerization.

Preferred photoinitiators are those that are stable at ambient conditions, although non-air stable photoinitiators can also be used. Suitable and preferred examples of photoinitiators are those selected from the commercially available Irgacure® or Darocure® series, like for example Irgacure® 651, Irgacure® 907, Darocure® 1173 or Darocure® 4265, Darocure® 4265, or BAPO type photonitiators such as Irgacure® 819.

Examples of suitable and preferred thermal initiators can be those used for charging the polymer such as 2,2'-azibiscyanovaleric acid (ACVA) (Wako Chemicals), 2,2'-azobis (2-methylpropionamide)dihydrochloride (V-50) (Wako Chemicals), ammonium peroxodisulfate (APS) or usual thermal initiators such as 2,2'-azobis(2-methylbutyronitrile) (Vazo59) (Wako Chemicals, 2,2'-azobis(isobutyronitrile) (AIBN).

Depending on the synthetic procedure, the type and concentration of additives in the RM mixture, like for example a higher or lower content of initiators or the use of specific types of initiators, and on additional treatments and process conditions, like for example external stimuli such as pressure or light irradiation, the shape of the particles can be controlled, to give for example particles with anisotropic shape, like prolate spherical or quasi-toroidal particles, or particles with isotropic shape, like spherical particles.

Suitable ways how to influence the particle shape are disclosed in WO 2012/152409 A1.

The polymer particles according to the present invention are preferably prepared by emulsion polymerization, suspension polymerization or dispersion polymerization.

In a preferred embodiment the polymer particles are prepared by a emulsion or suspension polymeriation process comprising:
a) mixing an RM (or two or more RMs), a chiral additive, and in case of suspension polymerization an initiator, with each other, heating the mixture to its isotropic phase, and cooling the mixture to a temperature where it exhibits a cholesteric phase,
b) combining the mixture with a solvent and a surfactant (continuous phase), for example by adding a solution of the surfactant in the solvent to the mixture or vice versa,
c) emulsifying the RMs, for example by stirring the mixture with an emulsifier, and in case of emulsion polymerization adding an initiator,
d) polymerizing the RMs, preferably by thermal polymerization or photopolymerization.

The invention also relates to the processes of preparing the polymer particles as described above and below.

The nature of the liquid solvent is related to the nature of the surfactant used, which is going to determinate the anchoring of the molecules in the particles (i.e. parallel, perpendicular and degenerated parallel or perpendicular disposition of the molecules with respect to the surface of the particles) and the optical properties.

In a preferred embodiment the continuous phase comprises at least one surfactant dissolved in a solvent. The surfactant (also acting as emulsifier for the monomers) must contain a polar block and an apolar block to disperse the final polymer particles in the continuous phase of the liquid after polymerization. It is very important that the surfactant does not alter the liquid crystal phase but at the same time stabilises the emulsion. Single surfactants or a blend of two or more surfactants can be used.

Non-ionic surfactants are preferred such as polyvinylpyrrolidone (PVP), cellulose acetate, hydroxypropylcellulose, polyoxyethylene glycol (PEG), glycerol alkyl esters, block copolymers with an aromatic block such as polystyrene or polyvinylnaphtalene and a polyolefin block for example polyethylene, polypropylene, polybutylene or polybutadiene (Kraton® and Septon® surfactants are commercial examples). However other types of surfactants, like for example cationic (for example trimethylhexadecyl ammonium chloride, cetrimonium chloride or benzethonium chloride) or anionic surfactants (for example sodium dodecyl sulfate (SDS), sodium laureth sulfate (SLS) or perfluorooctane sulfonate (PFOS), which are well known to the person skilled in the art the field, are also suitable for use in the process of preparing the particles.

The continuous phase (i.e. the polymerization medium) should be a solution of at least one surfactant in the solvent used for the synthesis, like for example a Kraton solution in dodecane or a PVP solution in ethanol. The continuous phase that is used as polymerization medium can also be used as dispersion medium for the final polymer particles. By appropriate selection the continuous phase can then serve an additional purpose in the further application of the particles and the layers or articles comprising them.

For example, in a preferred embodiment of the present invention, the continuous phase comprises an organic solvent with a low dielectric constant, preferably <10, more preferably <5. Suitable sovents of thiy type are for example non-polar hydrocarbon solvents such as the Isopar series (Exxon-Mobil), Norpar, Shell-Sol (Shell), Sol-Trot (Shell), naphtha, and other petroleum solvents, as well as long chain alkanes such as dodecane, tetradecane, decane and nonane. Particles dispersed in these solvents are suitable for use in the active layer of an electro-optic device. A homogenous switching of the particles in the perpendicular direction with respect to the electric field is observed at low voltages.

In another preferred embodiment of the present invention, the continuous phase comprises water. The final dispersion of the particles in water can be used in bio-applications directly as they are dispersed in a bio-compatible solvent and none washing process is required. Examples of the use of polymer particles for drug-delivery can be found in U.S. Pat. Nos. 5,302,397A or 8,367,116 B2.

In a preferred embodiment the polymer particles have a spherical shape, as exemplarily illustrated in FIG. 1a. In another preferred embodiment the polymer particles have an anisotropic shape, very preferably a prolate spherical shape, as exemplarily illustrated in FIG. 1b, or a quasi-toroidal shape, as exemplarily illustrated in FIG. 1c.

The polymer particles can be monodisperse (i.e. having a unimodal size) or polydisperse (i.e. having a bimodal or higher size distribution). Spherical particles with bimodal size are for example shown in FIG. 1a.

The size of the polymer particles can be varied according to the desired application. Especially preferred are polymer particles having a diameter from 15-50 microns, more preferably from 6-10 microns, most preferably from 1-5 microns.

Particles with a spherical shape, can be prepared directly by a heterogeneous polymerization process comprising steps a) to d) as described above.

Particles with an anisotropic shape, like prolate spherical or quasi-toroidal shape, can be prepared directly by heterogeneous polymerization comprising steps a) to d) as described above, wherein the shape anisotropy can be obtained by changing the initiator, as disclosed in WO 2012/152409 A1.

For manufacturing layers or articles, or for storage purposes, the polymer particles according to this invention are preferably dispersed in a continuous phase. The continuous phase is preferably a liquid, a solvent like water or an organic solvent, a liquid crystal medium, a polymerizable medium or a polymer. The continuous phase can also be the polymerization medium used for preparation of the polymer particles.

The continuous phase can be optically isotropic or anisotropic, for example an organic solvent, a liquid crystal medium, an isotropic polymer or polymer network, or a liquid crystal polymer or polymer network. Preferably the continuous phase is optically isotropic and transparent.

Suitable and preferred examples of liquids are dodecane, ethanol, water, heptane, petrol, toluene, isopropanol, methanol, acetonitrile, dimethylformaamide, metamethylmethacrylate, reactive mesogen mixtures (RMMs) or single liquid crystals, like for example 5CB or BL006 from Merck. Mixtures of different liquids in different ratios are also possible.

Preferably the continuous phase is selected from ketones, alcohols, aromatic solvents, aliphatic hydrocarbons, alicyclic hydrocarbons or halogenated hydrocarbons, very preferably from dodecane, methanol, ethanol and water.

In a preferred embodiment of the present invention, the continuous phase comprises or consists of one or more organic solvents having a low dielectric constant ($\in$) (for example dodecane ($\in$=2) or heptane ($\in$=1.9).

In another preferred embodiment of the present invention, the continuous phase is water or an aqueous phase.

In another preferred embodiment the continuous phase comprises a surfactant, preferably in a concentration from 5 to 10% wt., comprising a polar block and an apolar block to disperse the polymer particles. Preferable surfactants have some form of block, graft, branched or comb-like structure to maximize physical or chemical adsorption onto the surface of the particles. Long or branched aliphatic tails are preferable to increase the steric stabilization of the surfactant. Preferred surfactants are block copolymers of the type A-B or A-B-A with preferably and aromatic block for example polystyrene or polyvinylnaphthalene and the other a polyolefin for example polyethylene, polypropylene, polybutylene or polybutadiene. Commercially available Kraton G 1701 and Septon 1001, are suitable examples. However, other surfactants like polyvinylpyrrolidone, cellulose acetate, hydroxypropylcellulose, polyoxyethylene glycol with a clear polar and apolar block can be used as it is mentioned above. It is important that the surfactant must be dissolved in the solvent used and should not affect the mesophase.

The polymer particles according to this invention can be stored dispersed in the continuous phase, which is for example an isotropic or anisotropic liquid, or as a powder able to be dispersed in the isotropic or anisotropic liquid.

In a preferred embodiment the polymer particles are dispersed in one or more solvents, which are preferably selected from organic solvents. The solvents are preferably selected from ketones such as acetone, methyl ethyl ketone, methyl propyl ketone, methyl isobutyl ketone or cyclohexanone; acetates such as methyl, ethyl or butyl acetate or methyl acetoacetate; alcohols such as methanol, ethanol or isopropyl alcohol; aromatic solvents such as toluene or xylene; aliphatic hydrocarbons such as dodecane, decane, heptanes or hexane; alicyclic hydrocarbons such as cyclopentane or cyclohexane; halogenated hydrocarbons such as di- or trichloromethane; glycols or their esters such as PGMEA (propyl glycol monomethyl ether acetate), γ-butyrolactone. It is also possible to use binary, ternary or higher mixtures of the above solvents. The solvent or mixture of solvents will be chosen depending on the solubility of the surfactant, RMs and initiator, the synthetic procedure used and the dielectric constant requirements.

The polymer particles according to this invention can be introduced in the production of any kind of articles or coated layers obtained by conventional techniques such as coating, printing, extrusion or stretching techniques.

For the manufacturing of layers, films, foils or sheets, the polymer particles are preferably dispersed in a liquid, for example in a solvent or solvent mixture, which is then deposited onto a substrate.

The invention also relates to a process of manufacturing a layer, article, film, foil or sheet by dispersing the cholesteric polymer particles in liquid, depositing the liquid with the dispersed cholesteric polymer particles onto a substrate, and optionally removing the liquid.

As substrate for example glass or quartz sheets or plastic films can be used. Suitable plastic substrates are for example films of polyester such as polyethyleneterephthalate (PET) or polyethylene-naphthalate (PEN), polyvinylalcohol (PVA), polycarbonate (PC) or triacetylcellulose (TAC), very preferably PET or TAC films. As birefringent substrates for example uniaxially stretched plastics film can be used. PET films are commercially available for example from DuPont Teijin Films under the trade name Melinex®.

The liquid can be deposited onto the substrate by conventional coating techniques like for example spin-coating, blade-coating, spray-coating, push-coating, casting coating, roll-coating, dip-coating or bar-coating. The liquid can also be deposited to the substrate by conventional printing techniques like for example screen printing, offset printing, reel-to-reel printing, letter press printing, gravure printing, rotogravure printing, flexographic printing, intaglio printing, pad printing, heat-seal printing, ink-jet printing or printing by means of a stamp, hot stamp, die or printing plate.

The liquid or solvent is then preferably evaporated, for example by heating or applying low pressure, leaving a layer of the polymer particles on the substrate.

In another preferred embodiment of the present invention, the polymer particles are dispersed in a continuous phase comprising or consisting of a polymerizable material, which is polymerized after the layer is deposited onto the substrate. As a result a solid sheet or foil is formed in which the polymer particles are dispersed in the polymerized matrix, and which can be removed from the substrate or not.

Examples of suitable polymerizable materials to form a polymer matrix are methacrylates or methacrylate mixtures that are transparent, high resistant materials and miscible with several organic solvents such as petrol, toluene, heptane or dodecane. Acrifix® compounds are commercially available examples.

Polymerization of the continuous phase can be achieved by the conventional methods known to the expert, including the polymerization methods and the reagents and conditions used therein as described above for the production of the polymer particles.

The polymer particles can also be dispersed in a viscous material at elevated temperature, for example a polymer above its glass temperature, which is solidified or vitrified by cooling to room temperature.

The thickness of a layer or sheet comprising the polymer particles according to the present invention is preferably from 0.1 to 100 microns, very preferably from 15 to 60 microns.

Articles with a shape other than layers, like for example lenses, can for example be manufactured from a dispersion of the polymer particles in a polymerizable, polymerized, solidified or vitrified continuous phase by using molding techniques.

The invention also relates to a process of manufacturing an article by molding of a dispersion of the cholesteric polymer particles in a polymerizable, polymerized, solidified or vitrified continuous phase.

Suitable and preferred molding techniques are for example injection molding, extrusion, blow molding, compression molding, simple confinement of the particles in a mold with the desired shape or rotational molding.

In addition to the polymer particles the continuous phase may also comprise one or more additives selected from the group consisting of polymerization initiators, surfactants, stabilisers, catalysts, sensitizers, inhibitors, chain-transfer agents, co-reacting monomers or, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and nanoparticles.

The layers and articles of the present invention can be used in optical, electrooptical or electronic devices or components thereof. For example, they can be used in optical elements, like optical retarders, optical compensators, linear polarizers, circular polarizers, mirrors, collimators, diffusers, beam splitters, reflectors, colour filters, mono or polychromatic films, or as alignment layers, in polarization controlled lenses for autostereoscopic 3D displays, or in heat insulation sheets or IR reflection films for windows.

The layers and articles of the present invention can be used for example in devices selected from electrooptical displays, especially liquid crystal displays (LCDs), autostereoscopic 3D displays, organic light emitting diodes (OLEDs), optical data storage devices, and window applications.

The LC displays include without limitation displays with vertical alignment like the DAP (deformation of aligned phases), ECB (electrically controlled birefringence), CSH (colour super homeotropic), VA (vertically aligned), VAN or VAC (vertically aligned nematic or cholesteric), MVA (multi-domain vertically aligned), PVA (patterned vertically aligned) or PSVA (polymer stabilised vertically aligned) mode; displays with bend or hybrid alignment like the OCB (optically compensated bend cell or optically compensated birefringence), R-OCB (reflective OCB), HAN (hybrid aligned nematic) or pi-cell (π-cell) mode; displays with twisted alignment like the TN (twisted nematic), HTN (highly twisted nematic), STN (super twisted nematic), AMD-TN (active matrix driven TN) mode; displays of the IPS (in plane switching) mode, or displays with switching in an optically isotropic phase.

Above and below, percentages are percent by weight unless stated otherwise. All temperatures are given in degrees Celsius. m.p. denotes melting point, cl.p. denotes clearing point, $T_g$ denotes glass transition temperature. Furthermore, C=crystalline state, N=nematic phase, S=smectic phase and I=isotropic phase. The data between these symbols represent the transition temperatures. Δn denotes the optical anisotropy or birefringence ($\Delta n = n_e - n_o$, where $n_o$ denotes the refractive index parallel to the longitudinal molecular axes and $n_e$ denotes the refractive index perpendicular thereto), measured at 589 nm and 20° C. The optical and electrooptical data are measured at 20° C., unless expressly stated otherwise. "Clearing point" and "clearing temperature" mean the temperature of the transition from an LC phase into the isotropic phase.

Unless stated otherwise, the percentages of solid components in an RM mixture or RM mixture as described above and below refer to the total amount of solids in the mixture, i.e. without any solvents.

Unless stated otherwise, all optical, electrooptical properties and physical parameters like birefringence, permittivity, electrical conductivity, electrical resistivity and sheet resistance, refer to a temperature of 20° C.

Unless stated otherwise, as used herein plural forms of the terms herein are to be construed as including the singular form and vice versa.

Throughout the description and claims of this specification, the words "comprise" and "contain" and variations of the words, for example "comprising" and "comprises", mean "including but not limited to", and are not intended to (and do not) exclude other components.

It will be appreciated that variations to the foregoing embodiments can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

The following examples are intended to explain the invention without restricting it. The methods, structures and properties described hereinafter can also be applied or transferred to materials that are claimed in this invention but not explicitly described in the foregoing specification or in the examples.

EXAMPLES

In the following examples, the polymer particles are prepared either by emulsion polymerization or suspension polymerization. The difference between these two synthetic methods is the absence (in case of emulsion polymerization) or the presence (in case of suspension polymerization) of the initiator in the cholesteric droplets prior to the polymerization. The preparation of the emulsion or the suspension starts with heating a mixture composed of at least one RM, the chiral dopant, initiator (if needed) and the inhibitor until the isotropic liquid state. The mixture is allowed to reach the desired temperature and then the surfactant dissolved into the continuous phase is added for producing the emulsion or the suspension. Finally, the photopolymerization is initiated with a conventional UV-lamp with an optical filter (254-450 nm) for one hour and half.

Example 1

Monochromatic Sheet (Green)

3 g of direactive RM 257, 2 g of monoreactive RM520, 235.5 mg of chiral dopant BDH1281 (green), both available from Merck KgaA, Darmstadt, Germany, and 200 mg Irgacure®907 (photoinitiator, available from BASF AG, Ludwigshafen, Germany) are heated until the isotropic state and cooled to 90° C. A solution of 300 mg of Kraton G 1701 EU (linear diblock copolymer based on styrene and ethylene/propylene, S-E/P, with bound styrene of 35% mass) (as surfactant) and 45 mL of dodecane at 90° C. is added to the cholesteric mixture and emulsified with a Silverson homogeniser for 20 minutes at 14600 rpm. The emulsion is transferred to a flask previously heated at 90° C. and the photoinitiation is started by a UV-lamp coupled to a fiber optic cable. In order to homogenously excite the emulsion, a glass piece is coupled to the fiber optic cable and introduced into the emulsion. After two hours, the reaction is cooled to room temperature and the reaction mixture is filtered through a 50 micrometer cloth.

The particles (5.86±2.97 microns) are transferred to toluene to ensure the miscibility with the polymeric matrix based on PMMA and the solution is spin-coated onto PI glass at 80 rpm for 10 minutes.

The sheet exhibits a green reflection colour.

Figure 2:
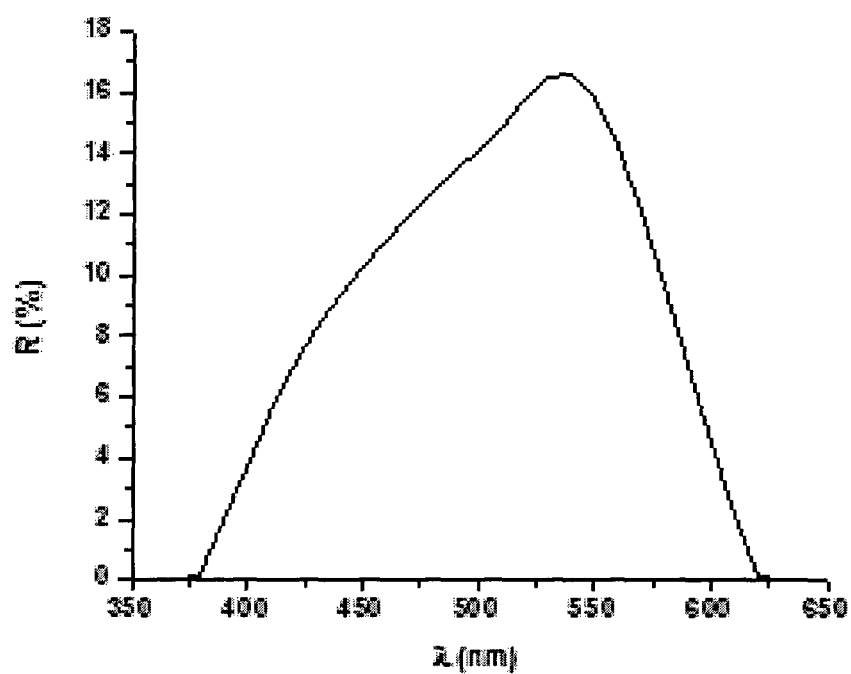
FIG. 2 shows the reflection spectrum of a green sheet with polymer particles according to Example 1.

FIG. 2 shows the reflection spectra of a green sheet with polymer particles according to Example 1.

Example 2

Monochromatic Sheets (Blue)

3 g of RM257, 2 g of RM520, 300 mg of BDH1281 (blue) and 150 mg Irgacure®369 are heated until the isotropic state and cooled to 90° C. A solution of 350 mg of Kraton G 1701 EU and 45 mL of dodecane at 90° C. is added to the cholesteric mixture and emulsified with a Silverson homogeniser for 20 minutes at 14600 rpm. The emulsion is transferred to a flask previously heated at 90° C. and the photoinitiation is started by a UV-lamp coupled to a fiber optic cable. In order to homogenously excite the emulsion, a glass piece is coupled to the fiber optic cable and introduced into the emulsion. After two hours, the reaction is cooled to room temperature and the reaction mixture is filtered through a 50 micrometer cloth.

The particles (3.81±1.64 microns) are transferred to toluene to ensure the miscibility with the polymeric matrix based on PMMA and the solution is spin-coated onto PI glass at 80 rpm for 10 minutes.

The sheet exhibits a blue reflection colour.

Figure 3:
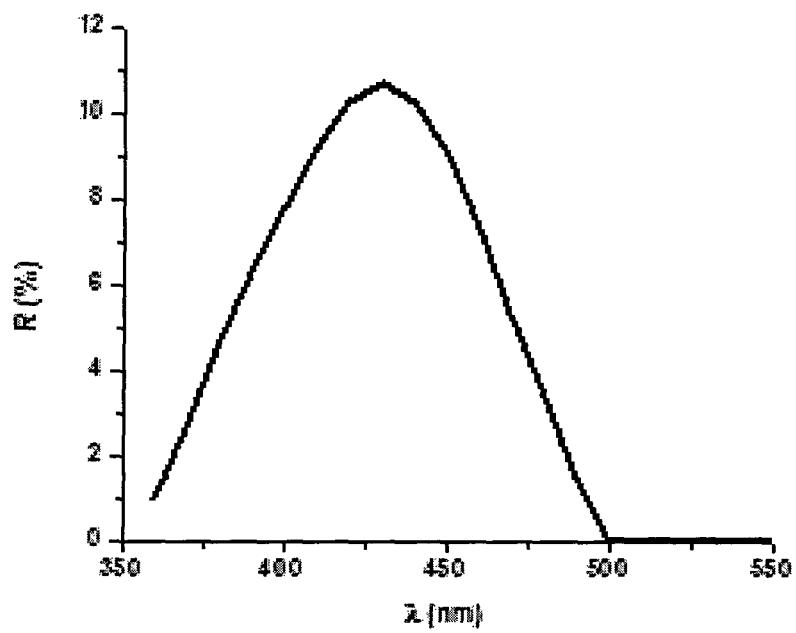
FIG. 3 shows the reflection spectrum of a blue sheet with polymer particles according to Example 2.

FIG. 3 shows the reflection spectrum recorded for a blue sheet with polymer particles according to Example 2.

Example 3

Monochromatic Sheets (Red)

5 g of RM257, 187.5 mg of BDH1281 (red) and 200 mg Irgacure®907 are heated to 150° C. and cooled to 90° C. A solution of 300 mg of Kraton G 1701 EU and 45 mL of dodecane at 90° C. is added to the cholesteric mixture and emulsified a Silverson homogeniser for 8 minutes at 9000 rpm. The emulsion is transferred to a flask previously heated at 90° C. and the photoinitiation is started by a UV-lamp coupled to a fiber optic cable. In order to homogenously excite the emulsion, a glass piece is coupled to the fiber optic cable and introduced into the emulsion. After two hours, the reaction is cooled to room temperature and the reaction mixture is filtered through a 50 micrometer cloth.

Polydisperse particles with a size between 5-25 microns are obtained.

Example 4

Polychromatic Sheets

Cholesteric particles with red, green and blue selective Bragg reflection are prepared as described in Example 1.

The particles are transferred to petrol to ensure the miscibility with the polymeric matrix based on MMA and 0.2 mL from a 85.3 mg (1:1:1#R:G:B particles)/mL polymer matrix is spin-coated onto PI glass at 500 rpm for 30 s.

Figure 4:
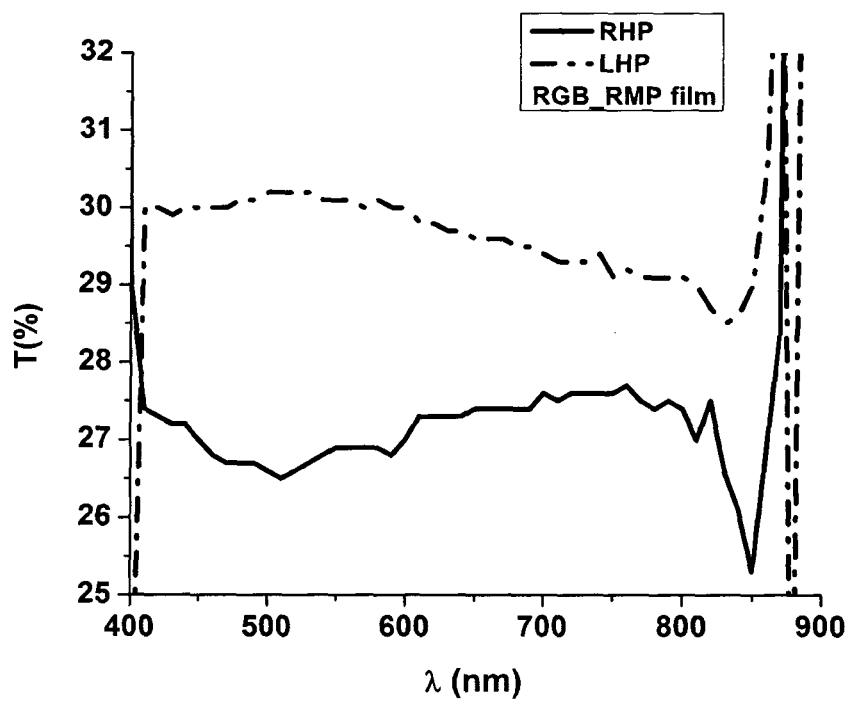
FIG. 4 shows the transmission spectra recorded for left and right circularly polarized light of a polychromatic broadband sheet with polymer particles according to Example 4.

FIG. 4 shows the transmission spectrum recorded for left and right circularly polarized light of a polychromatic broadband sheet with polymer particles according to Example 4.

Example 5

Heat-Blocking Sheets 5 g of RM257, 85 mg of BDH1281 and 200 mg Irgacure®907 are heated to 150° C. and cooled to 90° C. A solution of 300 mg of Kraton G 1701 EU and 45 mL of dodecane at 90° C. is added to the cholesteric mixture and emulsified with a Silverson homogeniser for 8 minutes at 9000 rpm. The emulsion is transferred to a flask previously heated at 90° C. and the photoinitiation is started by a UV-lamp coupled to a fiber optic cable. In order to homogenously excite the emulsion, a glass piece is coupled to the fiber optic cable and introduced into the emulsion. After two hours, the reaction is cooled to room temperature and the reaction mixture is filtered through a 50 micrometer cloth.

Polydisperse particles with a size between 5-25 microns are obtained.

Example 6

Security Optical Body

Cholesteric particles with a green selective Bragg reflection are prepared as described in Example 1. The cholesteric mixture prior to preparing the particles behaves as usual cholesteric material such as cholesteric flakes reflecting only the circularly polarized light having the same sense as the helix twist of the film (top picture corresponding to RHP) and transmitting the other sense (top picture corresponding to LHP). In the case of the cholesteric particles a pattern of reflection for the light without circular polarizer is observed, which is the same as for the right-handed circularly polarized light (corresponding to RHP) and a ring-like patterned reflection on the top of each particle for the opposite sense (corresponding to LHP).

Example 7

Cholesteric Particles Obtained in Water 5 g of RM257, 187.5 mg of BDH1281 and 200 mg Irgacure®907 are heated to 150° C. and cooled to 90° C. A solution of 300 mg of polyvinylpyrrolidone (PVP) and 45 mL of water at 90 C is added to the cholesteric mixture and emulsified for 8 min. The emulsion is transferred to a flask previously heated at 90° C. and the photoinitiation is started by a UV-lamp coupled to a fiber optic cable. In order to homogenously excite the emulsion, a glass piece is coupled to the fiber optic cable and introduced into the emulsion. After two hours, the reaction is cooled to room temperature and the reaction mixture is filtered through a 50 micrometer cloth.

The particles (5-25 microns) are ready to be coated onto surfaces by the desired coating-technique.

Example 8

Cholesteric Particles Obtained in Ethanol 2.5 g of RM257, 117.75 mg of BDH1281 and 250 mg of polyvinylpyrrolidone (PVP) (as surfactant) are solved in 30 mL of ethanol. The reaction mixture is heated to 80° C. and 100 mg Vazo59 are added. After two hours, the reaction is cooled to room temperature and the reaction mixture is filtered through a 50 micrometer cloth.

The particles (5-25 microns) are ready to be coated onto surfaces by the desired coating-technique.

The invention claimed is:
1. A layer or article comprising cholesteric polymer particles which have spherical, prolate spherical or quasi-toroidal shape, which show selective Bragg reflection of light and which are obtained by heterogeneous polymerization of a composition comprising at least one reactive mesogen and at least one chiral additive, or by heterogeneous polymerization of at least one chiral reactive mesogen, and wherein the cholesteric polymer particles have a radial configuration of the molecular director shown by the reflection of light for right-handed circularly polarized light (RHP) as a central spot on the top of each particle and a ring-like patterned reflection on the top of each particle for the opposite sense.

2. The layer or article according to claim 1, wherein the cholesteric polymer particles are dispersed in a continuous phase.

3. A layer or article according to claim 2, wherein the continuous phase is a liquid, a liquid crystal medium, a solvent, a polymerizable medium or a polymer.

4. A layer or article according to claim 2, wherein the continuous phase is optically isotropic and transparent.

5. A layer or article according to claim 2, wherein the continuous phase comprises one or more organic solvents with a low dielectric constant.

6. A layer or article according to claim 2, wherein the continuous phase comprises: ketones, alcohols, aromatic solvents, aliphatic hydrocarbons, alicyclic hydrocarbons or halogenated hydrocarbons.

7. A layer or article according to claim 1, which shows monochromatic reflection of light.

8. A layer or article according to claim 1, wherein the cholesteric polymer particles are prepared by a process of emulsion or suspension heterogeneous polymerization comprising the following steps
   a) mixing an reactive mesogen, or two or more reactive mesogens, a chiral additive, and in case of suspension polymerization an initiator, with each other, heating the mixture to its isotropic phase, and cooling the mixture to a temperature where it exhibits a cholesteric phase,
   b) combining the mixture with a solvent and a surfactant,
   c) emulsifying the reactive mesogen(s), and in case of emulsion polymerization adding an initiator, and
   d) polymerizing the reactive mesogen(s).

9. A process of manufacturing a layer or article according to claim 1, which comprises dispersing the cholesteric polymer particles in a liquid, depositing the liquid with the dispersed cholesteric polymer particles onto a substrate, and optionally removing the liquid.

10. A thermal film comprising a layer or article according to claim 1.

11. An optical element comprising a layer or article according to claim 1.

12. The optical element according to claim 11, which is an optical retarder, optical compensator, linear polarizer, circular polarizer, mirror, collimator, diffuser, beam splitter, reflector, colour filter, monochromatic film, polychromatic film, alignment layer, polarization controlled lens, or IR reflector.

13. An electrooptical device, optical data storage device or window, comprising a layer or article according to claim 1.

14. The electrooptical device according to claim 13, which is an LC display, an autostereoscopic 3D display, an electrophoretic display, or an organic light emitting diode (OLED).

15. A layer or article according to claim 2, wherein the continuous phase comprises dodecane, methanol, ethanol or water.

16. A layer or article according to claim 8, wherein in the process of emulsion or suspension heterogeneous polymerization the polymerizing step d) is by thermal polymerization or photopolymerization.

17. A layer or article according to claim 1, wherein the cholesteric polymer particles have a diameter of from 15-50 microns.

18. A layer or article according to claim 1, wherein the cholesteric polymer particles have a diameter of from 6-10 microns.

19. A layer or article according to claim 1, wherein the cholesteric polymer particles have a diameter of from 1-5 microns.

* * * * *